US012654444B2

(12) United States Patent
Ishida et al.

(10) Patent No.: US 12,654,444 B2
(45) Date of Patent: Jun. 16, 2026

(54) LIQUID EJECTION DEVICE

(71) Applicant: CANON KABUSHIKI KAISHA, Tokyo (JP)

(72) Inventors: Yuzuru Ishida, Kanagawa (JP); Shinya Iwahashi, Kanagawa (JP); Yoshinori Misumi, Tokyo (JP); Koichi Ishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 18/396,873

(22) Filed: Dec. 27, 2023

(65) Prior Publication Data

US 2024/0208212 A1 Jun. 27, 2024

(30) Foreign Application Priority Data

Dec. 27, 2022 (JP) ................................ 2022-209851

(51) Int. Cl.

| | |
|---|---|
| ***B41J 2/05*** | (2006.01) |
| ***B41J 2/14*** | (2006.01) |
| ***B41J 2/175*** | (2006.01) |

(52) U.S. Cl.

CPC . *B41J 2/05* (2013.01); *B41J 2/14* (2013.01); *B41J 2/175* (2013.01); *B41J 2002/14491* (2013.01)

(58) Field of Classification Search

CPC ....... B41J 2/05; B41J 2/14; B41J 2/175; B41J 2002/14491

See application file for complete search history.

(56) References Cited

U.S. PATENT DOCUMENTS

| | | | |
|---|---|---|---|
| 9,114,612 | B2 | 8/2015 | Kato et al. |
| 9,308,722 | B2 | 4/2016 | Ishida et al. |
| 9,682,552 | B2 | 6/2017 | Kato et al. |
| 9,764,550 | B2 | 9/2017 | Ishida et al. |
| 10,434,777 | B2 | 10/2019 | Kato et al. |

(Continued)

FOREIGN PATENT DOCUMENTS

| | | |
|---|---|---|
| JP | 6504938 B2 | 4/2019 |
| JP | 6918636 B2 | 8/2021 |

OTHER PUBLICATIONS

Extended European Search Report dated May 15, 2024, in European Patent Application No. 23218397.0.

(Continued)

*Primary Examiner* — Jason S Uhlenhake

(74) *Attorney, Agent, or Firm* — Venable LLP

(57) ABSTRACT

A liquid ejection device has an element substrate having an ejection port; and a voltage application unit applying a voltage to the element substrate, wherein the element substrate has a first layer having the ejection port and a first channel communicating with the ejection port and a second layer fixed to a back face of the first layer and having a second channel communicating with the first channel, a heat element for ejecting the liquid, a first electrode covering a surface of the heat element on a side of the first layer and exposed to the first channel, and a second electrode exposed to the first channel at a position different from the first electrode and not overlapping the heat element on a plan view, and the voltage application unit is configured to apply the voltage so that the first electrode is at a negative potential.

12 Claims, 13 Drawing Sheets

(56) References Cited

U.S. PATENT DOCUMENTS

| | | | |
|---|---|---|---|
| 10,710,361 B2 | 7/2020 | Misumi et al. | |
| 11,104,126 B2 | 8/2021 | Kato et al. | |
| 2020/0114643 A1* | 4/2020 | Kato | B41J 2/14129 |

OTHER PUBLICATIONS

U.S. Appl. No. 18/504,703, Hiroyuki Nagayama Yuzuru Ishida Koichi Omata, filed Nov. 8, 2023.

* cited by examiner

LIQUID EJECTION DEVICE

BACKGROUND OF THE INVENTION

Field of the Invention

The present invention relates to a liquid ejection device.

Description of the Related Art

A liquid ejection device is known in which the liquid inside a liquid chamber is heated by electrifying a heat element, the liquid is foamed in the liquid chamber by the film boiling thereof caused by the heating, and droplets are ejected from an ejection port by the foam energy at this time. When printing is done with such a liquid ejection device, physical effects such as the impact due to the cavitation caused when a liquid foams, contracts, and is defoamed on the area over a heat element may be brought about on the area over the heat element. In addition, when the liquid is ejected, chemical effects such that the components of the liquid thermally decompose and adhere to be fixed to and accumulated on the surface of the heat element may be brought about on the area over the heat element because the heat element is at a high temperature. For protecting the heat element from these physical and chemical effects on the heat element, a protective layer to cover the heat element is disposed on the heat element.

Here, in a heat-affected portion that is the protective layer over the heat element in the liquid ejection device, the phenomenon such that a color material, an additive, etc., which are contained in the liquid are disassembled at a molecular level by high temperature heating and are changed to low-soluble substances to be physically adsorbed on an upper protective layer arises. This phenomenon is referred to as "kogation." The adsorption of low-soluble organic and/or inorganic substances on the upper protective layer as described leads to ununiform heat conduction from the heat-affected portion to the liquid, and unstable foaming.

Japanese Patent No. 6918636 discloses the technique of providing, inside a liquid chamber, a first electrode including a heat-affected portion, and a second electrode different from the first electrode, applying a voltage across the two electrodes to generate an electric field in the liquid inside the liquid chamber, and thereby leading to the repulsion of the charged particles in the liquid to suppress kogation.

SUMMARY OF THE INVENTION

However, a better-durable liquid ejection device has been demanded in recent years, so that further suppression of generation of kogation has been required. Thus, the present invention is to further suppress generation of kogation in a liquid ejection device, and to improve the durability thereof.

The present invention is a liquid ejection device comprising:

an element substrate provided with an ejection port for ejecting a liquid; and a voltage application unit configured to apply a voltage to the element substrate, wherein the element substrate has a first layer provided with the ejection port on a surface thereof, and a second layer fixed to a back face of the first layer, the first layer is provided with a first channel communicating with the ejection port, the second layer is provided with a second channel communicating with the first channel, a heat element for ejecting the liquid from the ejection port, a first electrode covering a surface of the heat element on a side of the first layer, the first electrode being exposed to the first channel, and a second electrode exposed to the first channel at a position different from the first electrode, the second electrode not overlapping the heat element on a plan view, and the voltage application unit is configured to apply the voltage so that the first electrode is at a negative potential.

According to the present invention, generation of kogation in a liquid ejection device can be further suppressed, and the durability of the liquid ejection device can be improved.

Further features of the present invention will become apparent from the following description of exemplary embodiments with reference to the attached drawings.

DESCRIPTION OF THE EMBODIMENTS

Hereinafter examples of embodiments according to the present invention will be described using drawings. It is noted that the following description does not limit the scope of the present invention.

This embodiment describes an inkjet printing apparatus (printing apparatus) in the form of circulating a liquid such as ink through a tank and a liquid ejection device, but the inkjet printing apparatus may be in any other form. For example, one may provide two tanks on the upstream and downstream sides of the liquid ejection device to draw ink from one to the other tank, thereby causing the ink to flow in a pressure chamber without circulating the ink.

This embodiment also describes a so-called line head having a length corresponding to the width of a recording medium. The present invention can be also applied to a so-called serial liquid discharge device with which printing is done on a recording medium while the recording medium is scanned. For example, the serial liquid discharge device has the structure of installing printing element substrates for a black and a color ink, respectively, but is not limited to this. The serial liquid discharge device may be in the form of scanning a recording medium with a line head shorter than the width of the recording medium which is produced in such a way that a plurality of printing element substrates are arranged so that ejection ports thereof overlap in the direction of the ejection port array.

Description of Inkjet Printing Apparatus

Figure 1:
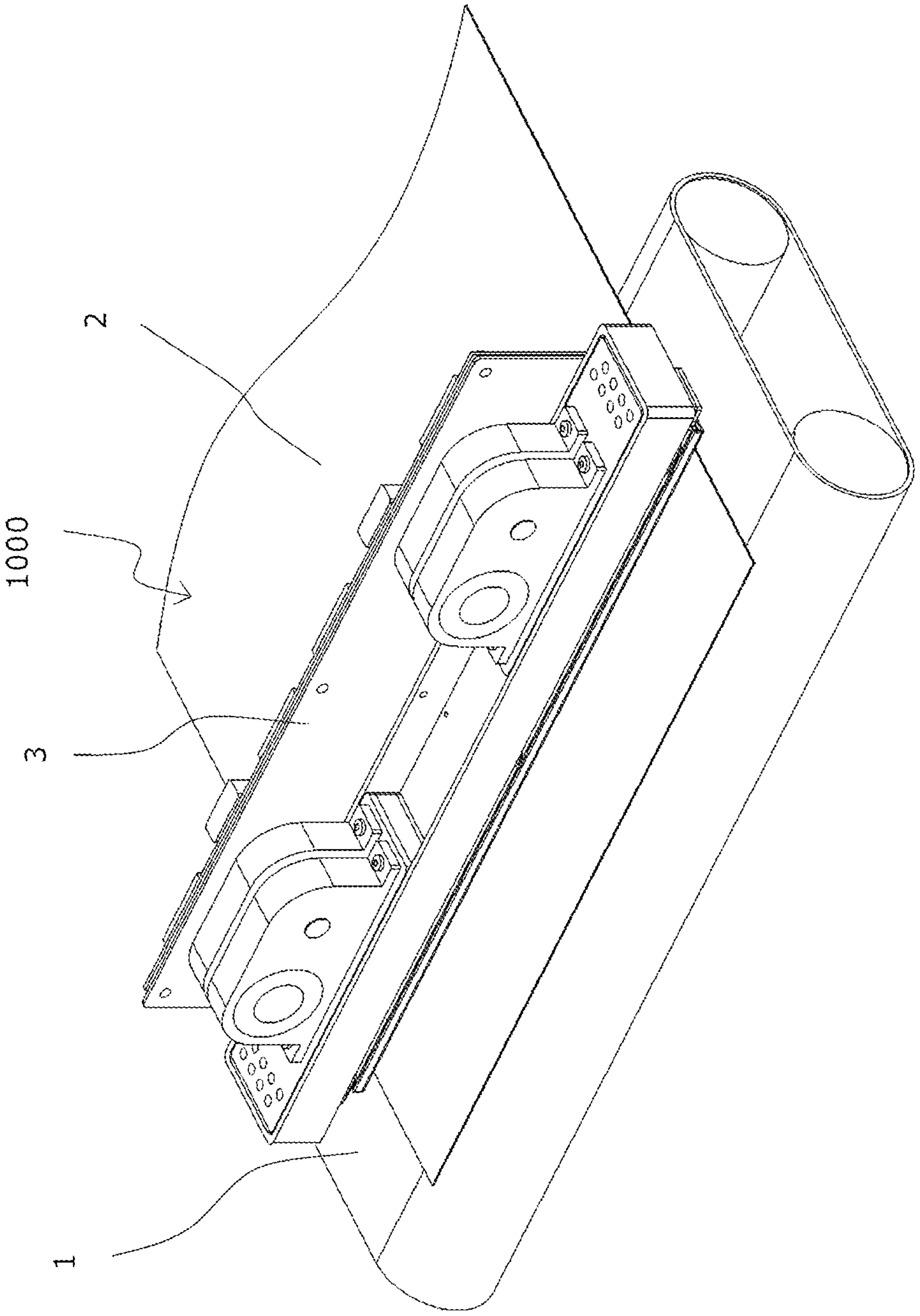
FIG. 1 is a perspective view showing a schematic structure of a printing apparatus.

FIG. 1 shows a schematic structure of an apparatus according to this embodiment with which a liquid is ejected, in particular, an inkjet printing apparatus 1000 with which the ink is ejected so that printing is done (hereinafter also referred to as a printing apparatus). The printing apparatus 1000 is provided with a conveying part 1 that conveys a recording medium 2, and a liquid ejection head 3 that is the line liquid ejection device disposed approximately orthogonally to the conveying direction of the recording medium 2. The printing apparatus 1000 is the line printing apparatus with which continuous printing is done through one pass while continuously or intermittently conveying a plurality of the recording media 2. The liquid ejection head 3 is connected to a liquid feeding member that is the feeding channel through which a liquid is fed to the liquid ejection head 3. A control unit 900 that transmits electric power and ejection control signals to the liquid ejection head 3 (see FIGS. 2A and 2B) is electrically connected to the liquid ejection head 3.

Description of Liquid Ejection Head

Figure 2A:
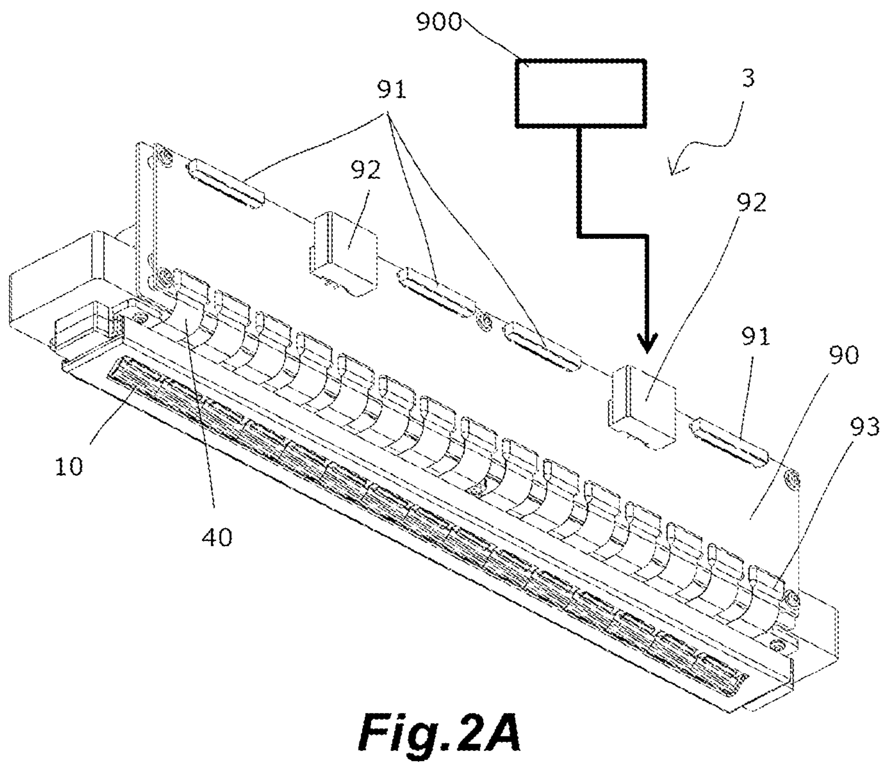
FIGS. 2A and 2B are perspective views of a liquid ejection head.
Figure 2B:
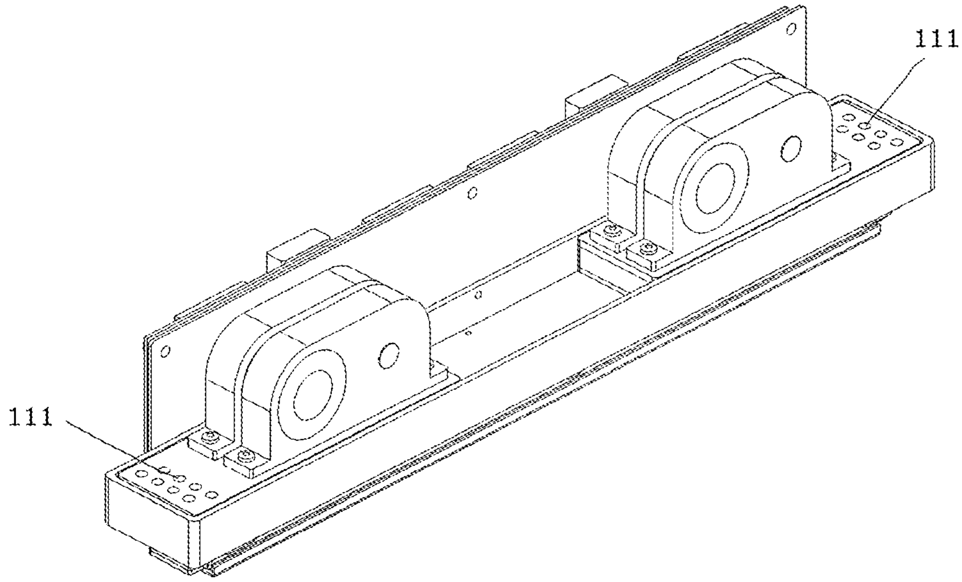

The structure of the liquid ejection head 3 according to this embodiment will be described. FIGS. 2A and 2B are perspective views of the liquid ejection head 3 according to this embodiment. The liquid ejection head 3 is the line liquid ejection head such that a plurality of printing element substrates 10 (fifteen in this embodiment) are linearly arranged (arranged in an in-line manner). The printing element substrates 10 are provided with ejection ports for ejecting the liquid.

As shown in FIG. 2A, the liquid ejection head 3 is provided with signal input terminals 91 and electric power feeding terminals 92 that are electrically connected to every printing element substrate 10 via flexible circuit boards 40 and an electric circuit board 90. The signal input terminals 91 and the electric power feeding terminals 92 are electrically connected to the control unit 900 of the printing apparatus 1000, and feed ejection driving signals, and electric power necessary for ejection, respectively, to the printing element substrates 10. The control unit 900 has the function as a voltage application unit configured to apply a voltage to the printing element substrates 10 via the electric power feeding terminals 92.

As shown in FIG. 2B, liquid connection parts 111 provided on both ends of the liquid ejection head 3 are connected to a liquid feeding system of the printing apparatus 1000, whereby the ink is fed from the feeding system of the printing apparatus 1000 to the liquid ejection head 3, and the ink having passed through the liquid ejection head 3 is collected into the feeding system of the printing apparatus 1000. As described, the liquid ejection head 3 is configured so that the liquid can be circulated through the liquid ejection head 3 and the outside. Each color ink can be circulated via the channel of the printing apparatus 1000 and the channel of the liquid ejection head 3.

Description of Ejection Module

Figure 3A:
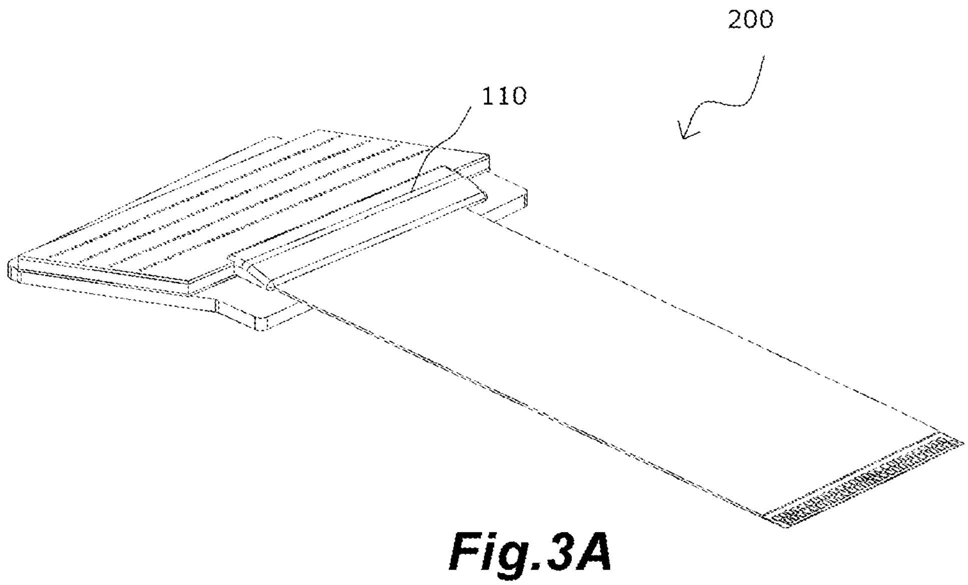
FIGS. 3A and 3B are perspective views of an ejection module.
Figure 3B:
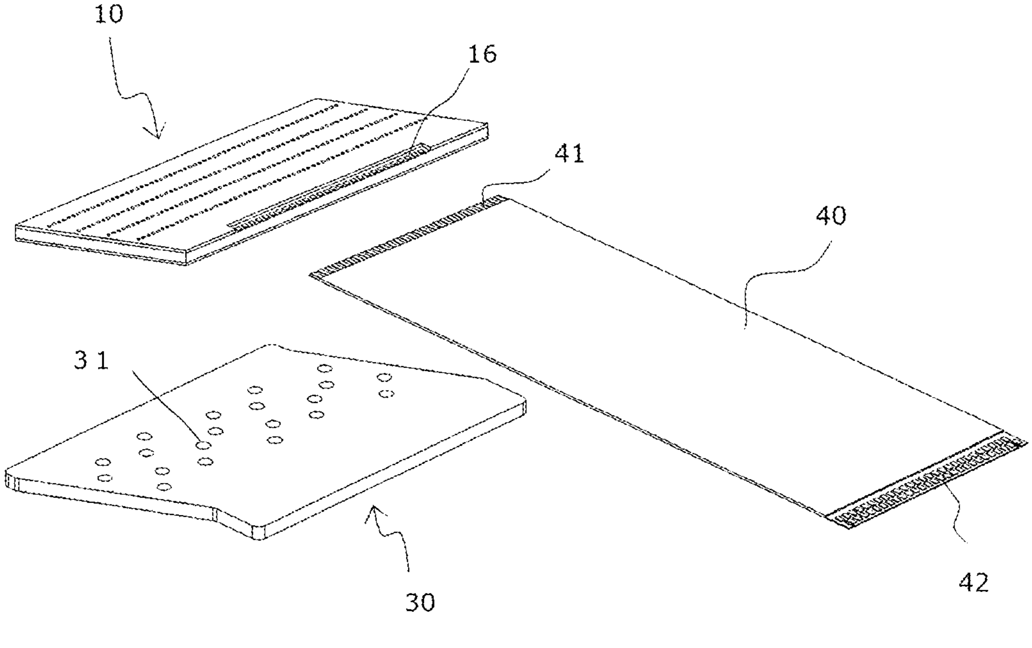

FIG. 3A shows a perspective view of one ejection module 200, and FIG. 3B shows an exploded view thereof. As the method of producing the ejection module 200, first, the printing element substrate 10 and the flexible circuit board 40 are adhered in advance onto a supporting member 30 where liquid communicating openings 31 are provided. Thereafter, a terminal 16 on the printing element substrate 10, and a terminal 41 on the flexible circuit board 40 are electrically connected by wire bonding, and thereafter, the wire-bonded part (electrically connected part) is covered with a sealant 110 to be sealed. A terminal 42 of the flexible circuit board 40 which is on the opposite side of the printing element substrate 10 is electrically connected to a connection terminal 93 of the electric circuit board 90. The supporting member 30 is a supporting body supporting the printing element substrate 10 and is a member allowing the printing element substrate 10 and a channel member that is not shown to fluidly communicate with each other. Thus, preferably, the supporting member 30 has high flatness, and can be joined to the printing element substrate 10 sufficiently highly reliably. Preferred examples of the material of the supporting member 30 include alumina, and resin materials.

Description of Structure of Printing Element Substrate

Figure 4A:
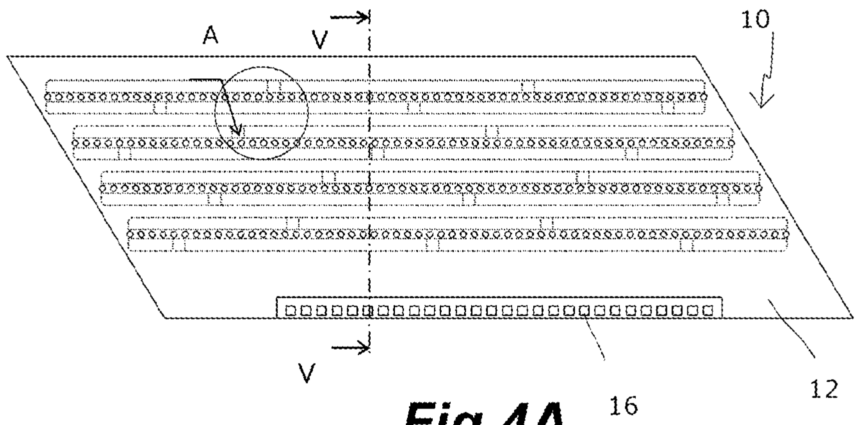
FIGS. 4A to 4C are plan views of a printing element substrate.
Figure 4B:
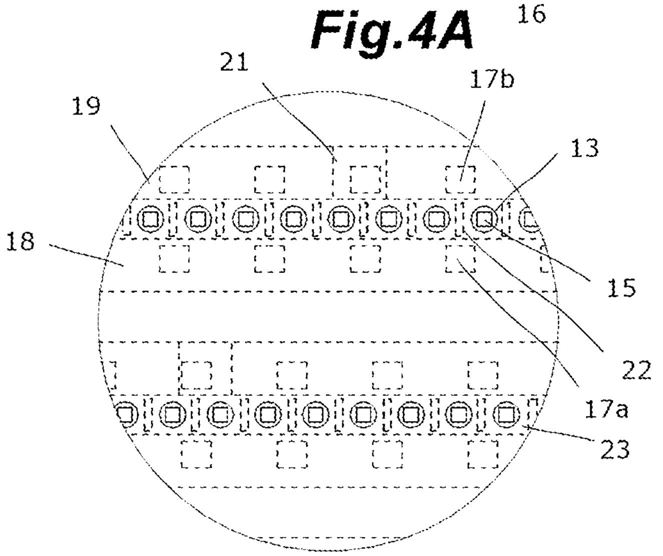
Figure 4C:
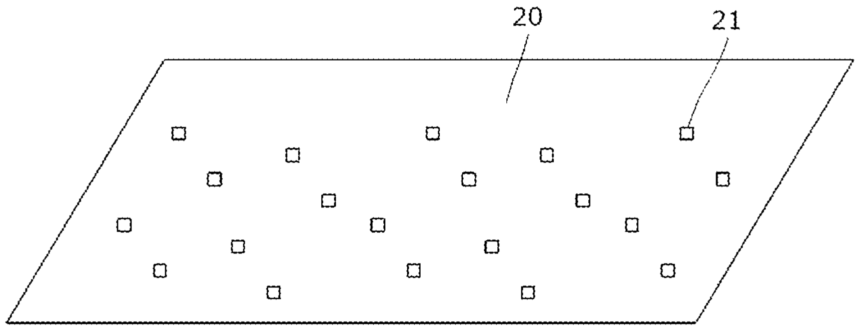

The structure of the printing element substrate 10 in this embodiment will be described. FIG. 4A is a plan view of a face of the printing element substrate 10 on the side where ejection ports 13 are formed, FIG. 4B is an enlarged view of the portion indicated by A in FIG. 4A, and FIG. 4C is a plan view of a back face of the face shown in FIG. 4A. As shown in FIG. 4A, four arrays of the ejection ports which correspond to four ink colors, respectively, are formed in an ejection port formation member 12 of the printing element substrate 10. Hereinafter, the direction in which the arrays of ejection ports extend such that a plurality of the ejection ports 13 are aligned will be referred to as the "ejection port array direction".

As shown in FIG. 4B, printing elements 15 that are heater elements for foaming the liquid by thermal energy are arranged at the positions corresponding to the ejection ports 13, respectively. A pressure chamber 23 including the printing elements 15 thereinside is partitioned by partitions 22. The printing elements 15 are electrically connected to the terminals 16 of FIG. 4A by electric wiring (not shown) provided for the printing element substrate 10. The printing elements 15 have heat elements that generate heat and boil the liquid based on pulse signals inputted from the control unit 900 of the printing apparatus 1000 via the electric circuit boards 90 and the flexible circuit boards 40 (FIGS. 3A and 3B). The liquid is ejected from the ejection ports 13 by the force of the foaming caused by this boiling. As shown in FIG. 4B, a liquid feeding channel 18 on one side, and a liquid collection channel 19 on the other side of the direction crossing the ejection port array direction each extend along each of the ejection ports arrays. The liquid feeding channel 18 and the liquid collection channel 19 are the channels provided for the printing element substrate 10 and extending in the ejection port array direction. The liquid feeding channel 18 and the liquid collection channel 19 communicate with the ejection ports 13 via feeding ports 17*a* and collection ports 17*b*, respectively.

As shown in FIG. 4C, a sheet-like lid member 20 is layered on the back face of the face of the printing element substrate 10 where the ejection ports 13 are formed. The lid member 20 is provided with the undermentioned plurality of openings 21 that communicate with the liquid feeding channels 18 and the liquid collection channels 19. In this embodiment, the lid member 20 is provided with three openings 21 per liquid feeding channel 18, and two openings 21 per liquid collection channel 19.

Figure 5:
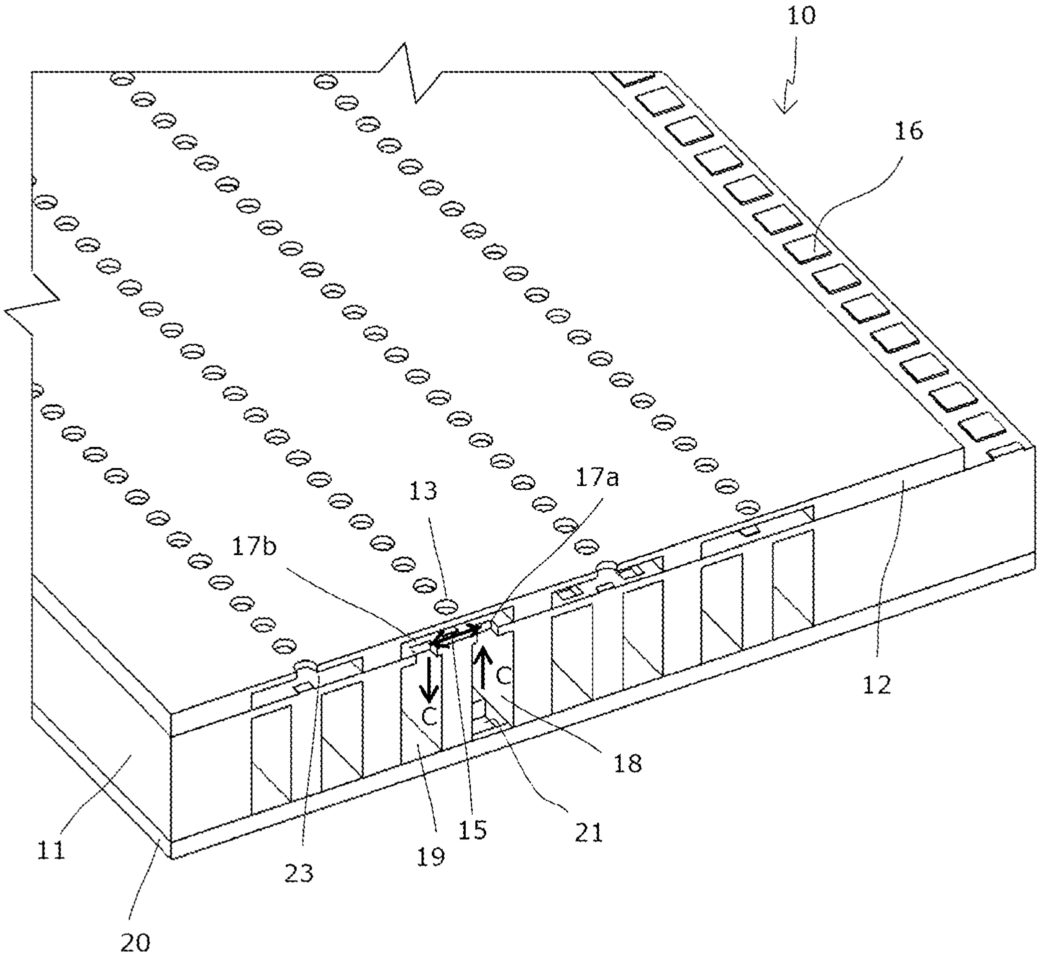
FIG. 5 is a perspective view of the printing element substrate and a lid member.

As shown in FIG. 5, the lid member 20 has the function as the lid that forms part of each wall of the liquid feeding channels 18 and the liquid collection channels 19 that are formed in a substrate 11 of the printing element substrate 10. Preferably, a photosensitive resin material and a silicon plate are used as the material of the lid member 20, and the openings 21 are provided by photolithography. Like this, the lid member 20 is to change the pitches of the channels by the openings 21, and in view of pressure losses, the thickness thereof is desirably thin, and is desirably formed of a film member.

Next, the flow of the liquid in the printing element substrate 10 will be described. FIG. 5 is a perspective view showing a cross section of the printing element substrate 10 and the lid member 20 taken along the line V-V of FIG. 4A. The printing element substrate 10 is such that the substrate 11 formed of Si, and the ejection port formation member 12 formed of a photosensitive resin are layered, and the lid member 20 is joined to the back face of the substrate 11. The ejection port formation member 12 is the first layer provided with the ejection ports 13 on the surface thereof, and the substrate 11 is the second layer fixed to the back face of the ejection port formation member 12 that is the first layer. The ejection port formation member 12 is provided with the pressure chambers 23 that are the first channels communicating with the ejection ports 13. The printing elements 15 are formed on one face side of the substrate 11, and the grooves that form the liquid feeding channels 18 and the liquid collection channels 19 extending along the arrays of the ejection ports are formed on the back face side thereof. The substrate 11 is provided with the feeding ports 17*a* and the liquid feeding channels 18 that constitute the second channels communicating with the pressure chambers 23 that are the first channels. The substrate 11 is provided with the collection ports 17*b* and liquid collection channels 19 that constitute the third channels communicating with the pressure chambers 23 that are the first channels. The liquid feeding channels 18 and the liquid collection channels 19 that are formed of the substrate 11 and the lid member 20 are connected to a common feeding channel and a common collection channel that are in the channel member (not shown), respectively, and there is the differential pressure between the liquid feeding channels 18 and the liquid collection channels 19. When the liquid is ejected from a plurality of the ejection ports 13 of the liquid ejection head 3, and printing is being done, some of the ejection ports 13 do not operate for the ejection. In relation to such ejection ports 13, the foregoing differential pressure causes the liquid in the liquid feeding channels 18 provided in the substrate 11 to flow to the liquid collection channels 19 via the feeding ports 17*a*, the pressure chambers 23, and the collection ports 17*b* (the flow indicated by the arrows C in FIG. 5). This flow allows the thickened ink generated by the evaporation from the ejection ports 13, bubbles, foreign matter, etc., which are in the ejection ports 13 and the pressure chambers 23 that are in the pause of the operations thereof for printing, to be collected into the liquid collection channels 19. In addition, the thickening of the ink in the ejection ports 13 and the pressure chambers 23 can be suppressed. The liquid collected into the liquid collection channels 19 is collected into communicating openings, individual collection channels, and the common collection channel, in this order, in the channel member (not shown) via the openings 21 of the lid member 20, and the liquid communicating openings 31 of the supporting member 30 (see FIG. 3B), and finally collected into the feeding channel of the printing apparatus 1000.

Figure 6A:
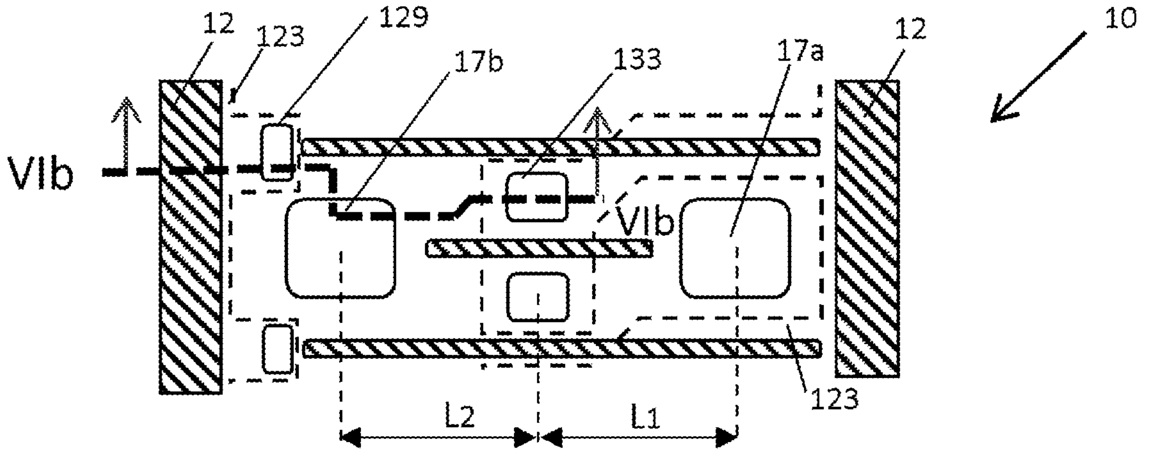
FIGS. 6A and 6B are a top view and a cross-sectional view illustrating the liquid ejection head according to an embodiment.
Figure 6B:
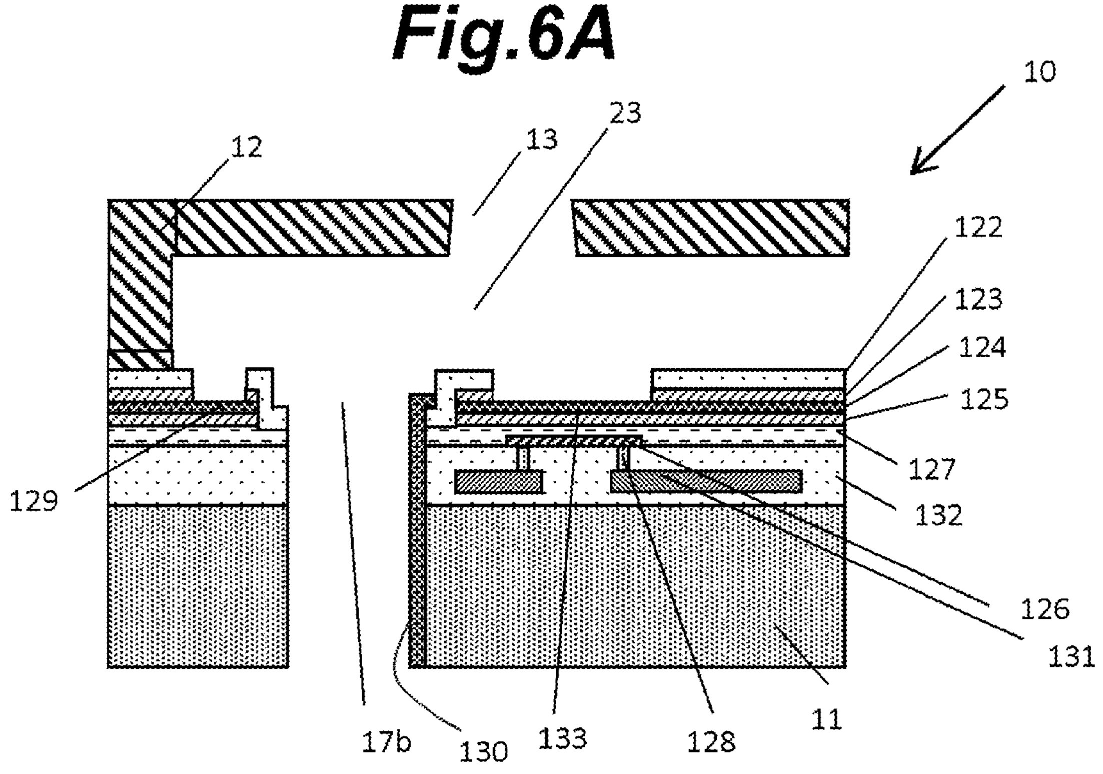

Description of Printing Element Substrate, and Structure of Heat-Affected Portion FIG. 6A is an enlarged plan view schematically showing the vicinity of a heat-affected portion of one of the pressure chambers 23 of the printing element substrate 10. FIG. 6B is a cross-sectional view taken along the line VIb-VIb of FIG. 6A.

In the liquid ejection head 3, the printing element substrates 10 are each formed by layering a plurality of layers on the substrate 11 formed of silicon. In this embodiment, a heat accumulation layer 132 that is formed of a thermal oxidation film, a SiO film, a SiN film, etc., is disposed on the substrate 11. A heat element 126 is disposed on the heat accumulation layer 132 at the position opposite each of the ejection ports 13. An electrode wiring layer 131 as the wiring formed of a metal material such as Al, Al—Si, and Al—Cu is connected to the heat element 126 via a tungsten plug 128. An insulating protective layer 127 is disposed on the heat element 126. The insulating protective layer 127 is provided on the top side of the heat element 126 so as to cover the heat element 126. The insulating protective layer 127 is formed of a SiO film, a SiN film, etc. The insulating protective layer 127 is preferably thin in view of thermal efficiency of foaming, and thus, is set to have a thickness of 150 nm.

A protective layer is disposed on the insulating protective layer 127. The protective layer is made up of a lower protective layer 125, an upper protective layer 124, and an adhesive protective layer 123, and protects the surface of the heat element 126 from chemical and physical impacts following the heat generation of the heat element 126.

In this embodiment, the lower protective layer 125 is formed of tantalum (Ta), the upper protective layer 124 is formed of iridium (Ir), and the adhesive protective layer 123 is formed of tantalum (Ta). When other than iridium, the upper protective layer 124 is desirably a platinum group element such as platinum (Pt) and ruthenium (Ru).

The protective layer formed of these materials has electroconductivity. A liquid-resistant protective layer 122 for liquid resistance and improvement in adhesiveness to the ejection port formation member 12 is formed on the adhesive protective layer 123. The liquid-resistant protective layer 122 is formed of SiCN.

When the liquid is ejected, the top face of the upper protective layer 124 is in contact with the liquid and is under a severe environment such that the temperature of the liquid on the top face of the upper protective layer 124 rises instantly so that the liquid foams, and then is defoamed there to cavitate. Therefore, in this embodiment, the upper protective layer 124 formed of a highly reliable iridium material having high corrosion resistance is formed at the position corresponding to the heat element 126 and is in contact with the liquid.

In this embodiment, the structure of circulating the ink in a liquid channel such that the liquid is fed from the feeding port 17*a* and collected into the collection port 17*b* in the pressure chamber 23 is employed. That is, the liquid is fed to the pressure chamber 23 that is the first channel from the feeding port 17$a$ that constitutes the second channel, and the liquid in the pressure chamber 23 that is the first channel is collected from the collection port 17$b$ that constitutes the third channel. On the heat element 126, the liquid flows from the feeding port 17$a$ (upstream side) toward the direction of the collection port 17$b$ (downstream side) during printing.

Desirably, an ink-resistant protective film 130 formed of TiO, TaO, etc., is formed for protecting the substrate 11 and the heat accumulation layer 132 that are in the channel from the feeding port 17$a$ (upstream side) to the collection port 17$b$ (downstream side) from dissolving in the ink.

In the liquid ejection head 3 according to this embodiment, the kogation suppression process for suppressing kogation that accumulates on the upper protective layer 124 on the heat element 126 during printing is carried out. That is, the kogation suppression process is carried out when the heat element 126 generates heat for ejecting the liquid from the ejection port 13. Part of the upper protective layer 124 covers the surface of the heat element 126 on the first layer side (ejection port formation member 12 side), and functions as a first electrode 133 exposed to the pressure chamber 23 that is the first channel. The substrate 11 that is the second layer is provided with a second electrode 129 exposed to the pressure chamber 23 that is the first channel at a position different from the first electrode 133. The second electrode 129 is disposed on the opposite side of the heat element 126 across the collection port 17$b$. That is, on the plan view shown in FIG. 6A, the second electrode 129 is provided at a position that does not overlap the heat element 126. The first electrode 133 is positioned between the feeding port 17$a$ that is the second channel, and the collection port 17$b$ that is the third channel in the flowing direction of the liquid in the pressure chamber 23. A voltage is applied to the first electrode 133 and the second electrode 129. The voltage is applied to the electrodes via the flexible circuit boards 40 and the printing element substrates 10 as shown in FIG. 2A. Both the first electrode 133 and the second electrode 129 are preferably formed of the same material in the platinum group. For example, both the first electrode 133 and the second electrode 129 are preferably formed of Ir, Pt, or Ru. The control unit 900 as the voltage application unit can apply the voltage to the first electrode 133 and the second electrode 129. This embodiment is characterized in that the substrate 11 that is the second layer is at 0 V (ground), and the voltage is applied so that the first electrode 133 is at a negative potential and the second electrode 129 is at a positive potential. It is noted that the effect of this embodiment is obtained if the substrate 11 that is the second layer is at 0 V (ground), and the voltage is applied so that the first electrode 133 is at a negative potential. The voltage application according to this embodiment, and the kogation suppression effect thereby will be described in the undermentioned examples.

Formation of an electric field through the liquid leads to repulsion of particles of a pigment or the like which are charged with a negative potential in the liquid for the surface of the upper protective layer 124 on the heat element 126. Then, the abundance of the particles of a pigment or the like in the vicinity of the surface of the upper protective layer 124 which are charged with a negative potential is reduced, whereby the kogation accumulating on the upper protective layer 124 on the heat element 126 during printing is suppressed. Kogation is the phenomenon such that a color material, an additive, etc., which are contained in a liquid are disassembled at a molecular level by high temperature heating and are changed to low-soluble substances to be physically adsorbed on the upper protective layer 124. Therefore, when the upper protective layer 124 is heated at a high temperature, reducing the abundance of a color material (pigment) and an additive in the vicinity of the surface of the upper protective layer 124 on the additive heat element 126 which causes kogation leads to kogation suppression. Generation of kogation depends on the characteristics of the color material (pigment) and the additive. Therefore, preferably, the control unit 900 applies a different voltage according to the used liquid to the first electrode 133 and the second electrode 129. This optimizes the kogation suppression effect by the voltage application according to this embodiment and allows electric power consumption to be suppressed.

The distance L1 between the heat element 126 and the feeding port 17$a$, and the distance L2 between the heat element 126 and the collection port 17$b$ are equal. In relation to liquid refilling after the foaming, the liquid is refilled from the feeding port 17$a$ and the collection port 17$b$, and the liquid refiling time is short so that high-speed driving can be performed.

The detailed experiments by the inventor of the present invention revealed that the potential relationship between the first electrode 133, the second electrode 129, and the substrate 11 affects kogation suppression. The details of the experiments are as follows.

In these experiments, examination was made using an ink containing a solid content including a magenta pigment, wax, and latex, and being with a negative zeta potential.

In these experiments, a predetermined voltage was applied to the first electrode 133 and the second electrode 219 by the use of an external power supply. In these experiments, the voltage was applied from the outside of the liquid ejection head 3 by the use of the control unit 900 as the external power supply, as the voltage application unit, whereas a member configured to apply the voltage to the electrode 113 and the second electrode 219 may be provided in the substrate 11.

Comparative Example 1

Figure 7A:
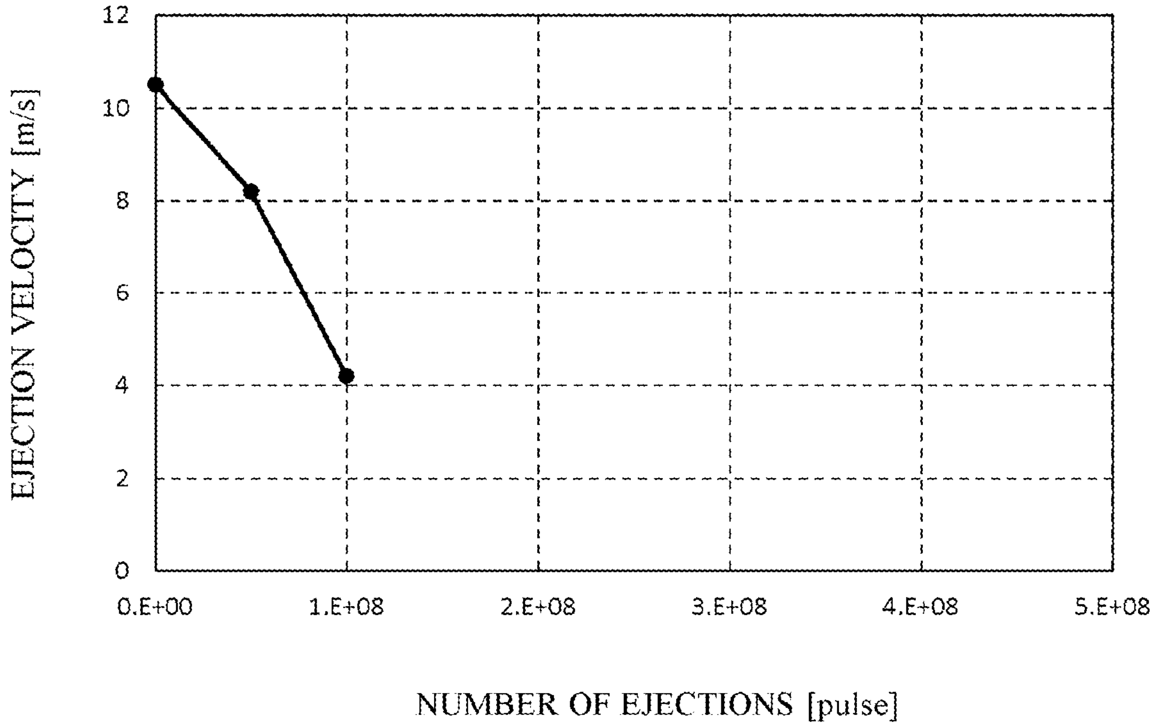
FIG. 7A is a graph showing the relationship between the number of ejections of ink, and the ejection velocity thereof in comparative example 1.

The graph of FIG. 7A shows the relationship between the number of ejections of the ink, and the ejection velocity of the ink in comparative example 1 where no kogation suppression process was performed. At this time, the voltage was not applied to the first electrode 133 or the second electrode 219, and thus, the first electrode 133 and the second electrode 219 were floating electrodes.

The ejection velocity gradually reduced just after the ejection was started. When the number of ejections reached $0.5\times10^{8}$, the ejection velocity was found to be lower than the initial ejection velocity by approximately 2 m/s. At this time point, it was visually confirmed that much kogation accumulated on the surface of the upper protective layer 124 on the heat element 126. After the number of ejections reached $1\times10^{8}$, the kogation further accumulated, and the ejection velocity also reduced.

Comparative Example 2

Figure 7B:
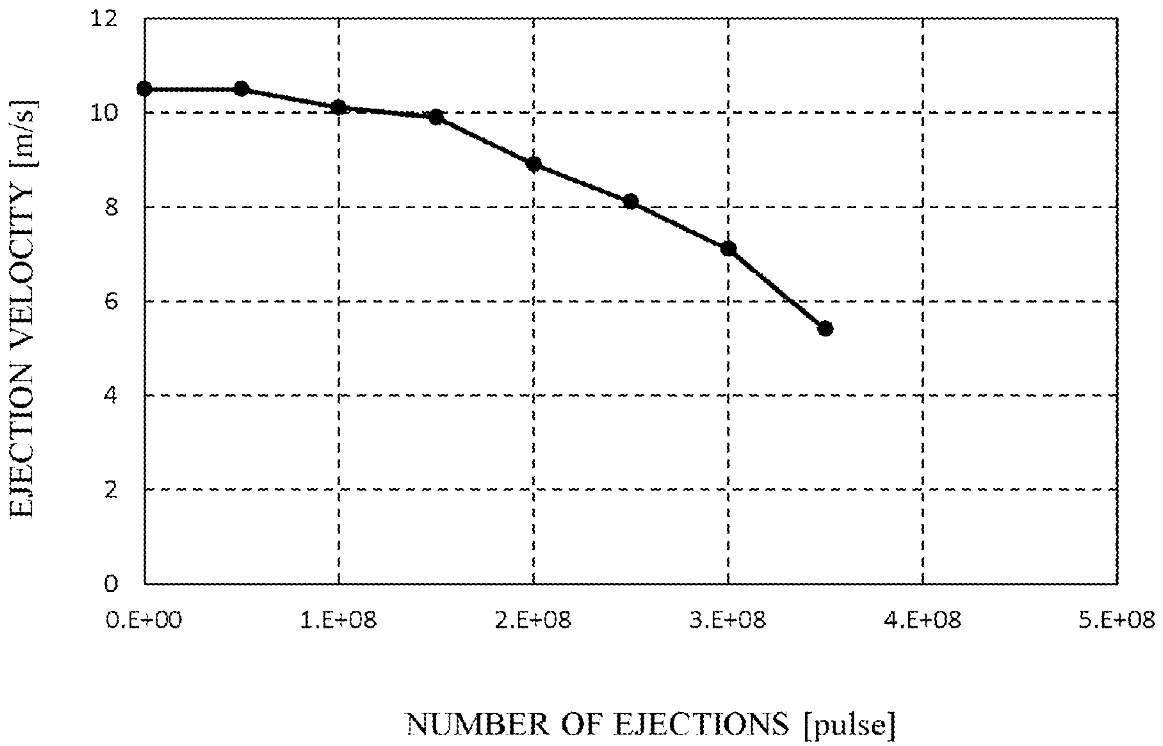
FIG. 7B is a graph showing the relationship between the number of ejections of ink, and the ejection velocity thereof in comparative example 2.

The graph of FIG. 7B shows the relationship between the number of the ejections of the ink, and the ejection velocity thereof when the kogation suppression process of comparative example 2 was performed. The kogation suppression process of comparative example 2 was such that when a liquid was ejected, a voltage of 2 V was applied across the first electrode 133 of the upper protective layer 124 and the second electrode 219 by the use of the external power supply to make the potential of the first electrode 133 side match the ground potential of the substrate 11. At this time, the first electrode 133 was at 0 V, which is the same potential as the substrate 11, and the potential of the second electrode 129 was +2 V. At this time, an electric field was formed across the first electrode 133 of the upper protective layer 124, and the second electrode 129 through the liquid. In the circulation of the liquid in the pressure chamber 23, the liquid flows from the feeding port 17*a* to the collection port 17*b* of FIG. 6A, and the second electrode 129 was positioned on the downstream side of the flow of the circulation of the liquid. The ejection durability in this liquid ejection device was such that at the time point when the number of ejections reached $2\times10^8$, slight kogation on the surface of the upper protective layer 124 was confirmed, whereas the reduction in ejection velocity fell within 2 m/s. However, further continuation of the ejection led to a gradual reduction in ejection velocity, and the reduction in ejection velocity was more than 3 m/s when the number of ejections reached $3\times10^8$. In this case, it was also visually confirmed that kogation accumulated on the surface of the upper protective layer 124.

Further, when the voltage was applied so that the potential difference between the first electrode 133 and the second electrode 129 was at least 2.5 V to form a larger electric field across the electrodes, iridium itself, which was used as the material of the first electrode 133, eluted into the ink by an electrochemical reaction. Therefore, the method of applying the voltage in which the potential of the first electrode 133 was at 0 V as a conventional method could not lead to formation of a sufficient electric field across the electrodes, and continuous ejection of the ink led to accumulation of kogation on the surface of the upper protective layer 124 on the heat element 126, and the reduction in ejection velocity.

Example 1

Figure 7C:
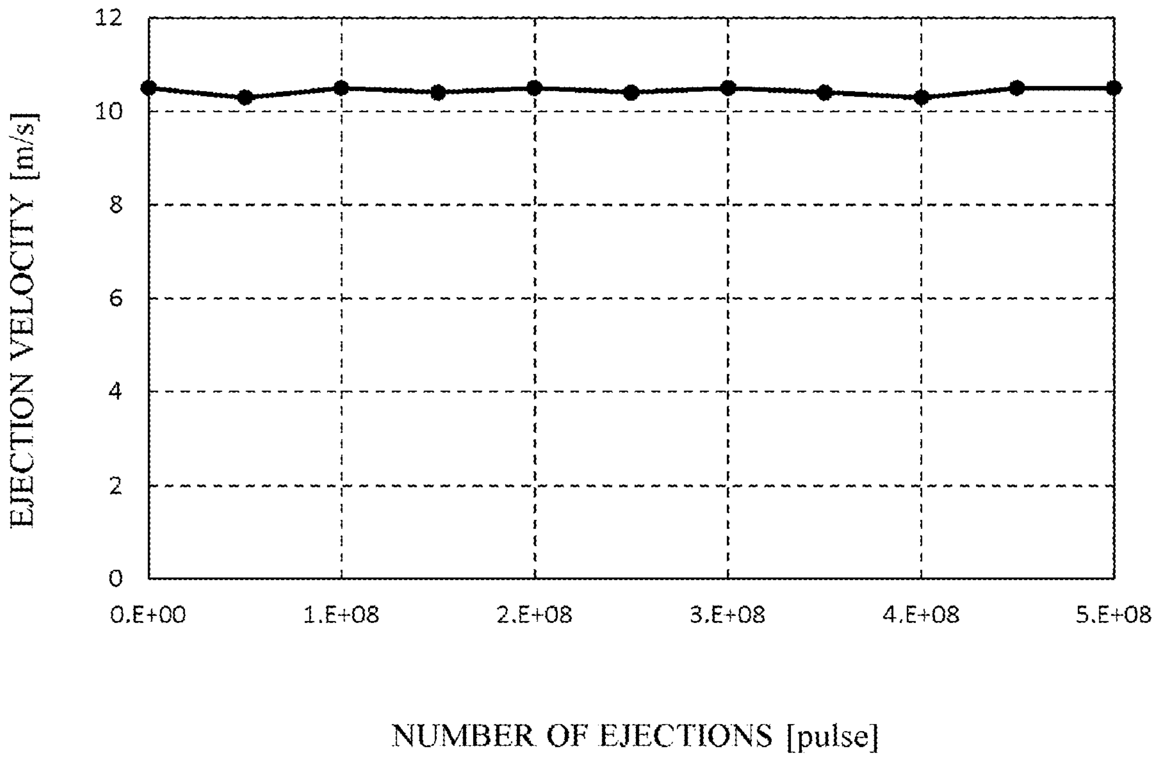
FIG. 7C is a graph showing the relationship between the number of ejections of ink, and the ejection velocity thereof in example 1.

The graph of FIG. 7C shows the relationship between the number of ejections of the ink, and the ejection velocity thereof when the kogation suppression process of example 1 which was based on the embodiment of the present invention was performed.

The kogation suppression process of example 1 was such that the substrate 11 was at the ground potential, and the voltage was applied so that the first electrode 133 of the upper protective layer 124 was at a negative potential (−2 V) by the use of the external power supply that allowed a negative voltage to be applied. The second electrode 129 was set to be a floating electrode.

The ink was ejected under the same ejection conditions as comparative examples 1 and 2. No large reduction in ejection velocity was found, and the reduction in velocity fell within 0.5 m/s even when the number of ejections exceeded $5\times10^8$.

In addition, when the surface of the upper protective layer 124 on the heat element 126 was observed with an optical microscope at this time point, kogation as found in comparative examples 1 and 2 did not adhere thereto.

Example 2

Figure 7D:
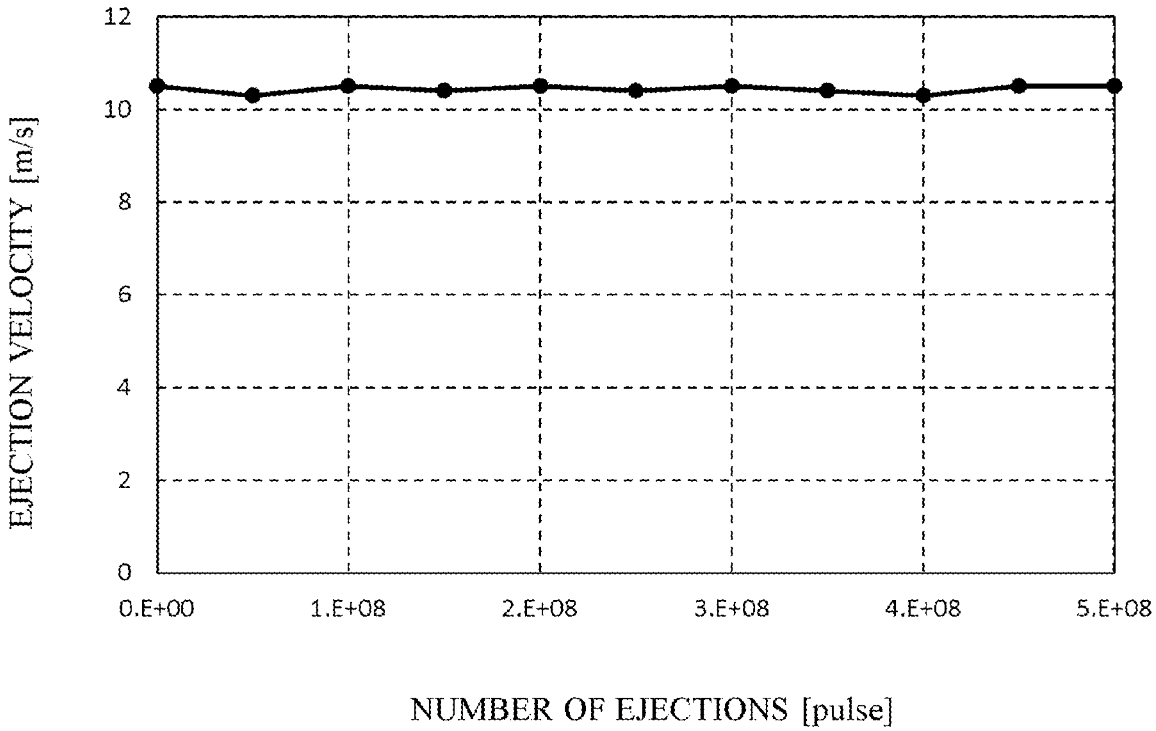
FIG. 7D is a graph showing the relationship between the number of ejections of ink, and the ejection velocity thereof in example 2.

The graph of FIG. 7D shows the relationship between the number of the ejections of the ink, and the ejection velocity thereof when the kogation suppression process of example 2 which was based on the embodiment of the present invention was performed.

The kogation suppression process of example 2 was such that the substrate 11 was at the ground potential, and the voltage was applied so that the first electrode 133 of the upper protective layer was at a negative potential by the use of the external power supply that allowed a negative voltage to be applied. In addition, the substrate 11 was at the ground potential, and a positive voltage was applied to the second electrode 129 by the use of another external power supply. At this time, the potential of the first electrode 133 was set to be −1 V, the potential of the second electrode 129 was set to be 1 V, and the potential difference between the first electrode 133 and the second electrode 129 was 2 V.

Compared to example 1, the potential of the first electrode 133 was changed from −2 V to −1 V. At this time, the voltage applied across the heat element 126 and the first electrode 133 became lower, and whereby the film thickness of the insulating protective layer 127 could be designed thinner, which allowed the liquid to be ejected with lower energy.

The ink was ejected under the same ejection conditions as comparative examples 1 and 2. No large reduction in ejection velocity was found, and the reduction in velocity fell within 0.5 m/s as in example 1 even when the number of ejections exceeded $5\times10^8$.

In addition, when the surface of the upper protective layer 124 on the heat element 126 was observed with an optical microscope at this time point, kogation as found in comparative examples 1 and 2 did not adhere thereto.

Example 3

Figure 7E:
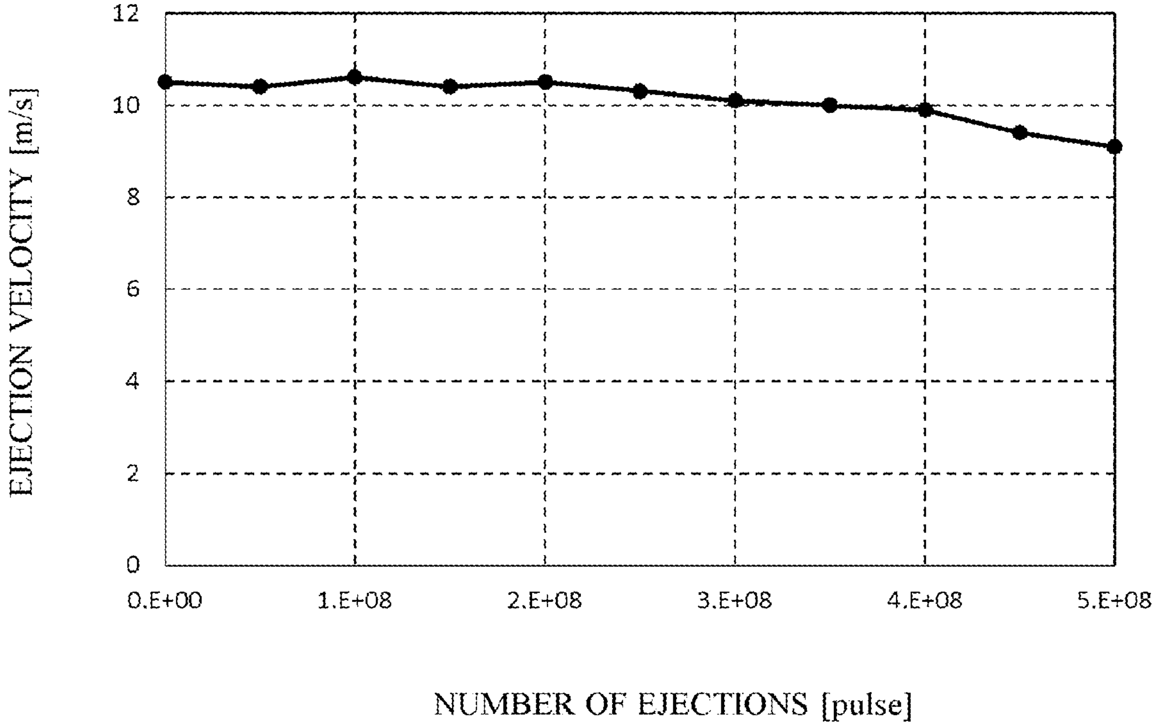
FIG. 7E is a graph showing the relationship between the number of ejections of ink, and the ejection velocity thereof in example 3.

The graph of FIG. 7E shows the relationship between the number of the ejections of the ink, and the ejection velocity thereof when the kogation suppression process of example 3 which was based on the embodiment of the present invention was performed.

In this example, the voltage was applied to the first electrode 133 and the second electrode 129 by the use of the external power supply in the same manner as in example 2. At this time, the potential of the first electrode 133 was set to be −0.5 V, the potential of the second electrode 129 was set to be 1 V, and the potential difference between the first electrode 133 and the second electrode 129 was 1.5 V.

Compared to example 1, the potential of the first electrode 133 was changed from −2 V to −0.5 V. At this time, the voltage across the heat element 126 and the first electrode 133 became lower, and whereby the film thickness of the insulating protective layer 127 could be designed thinner, which allowed the liquid to be ejected with lower energy.

The ink was ejected under the same ejection conditions as in comparative examples 1 and 2. The ejection velocity reduced more than in example 1 at the time point, but the reduction in velocity fell within 1.5 m/s when the number of ejections reached $5\times10^8$.

In addition, when the surface of the upper protective layer 124 on the heat element 126 was observed with an optical microscope at this time point, kogation as found in comparative examples 1 and 2 did not adhere thereto.

Impurities derived from the pigment deposited on the first electrode 133 according to an ink when the potential difference between the first electrode 133 and the second electrode 129 became large. It was confirmed that setting a potential difference small as in example 3 was also useful for the durability of a heater.

Example 4

Figure 7F:
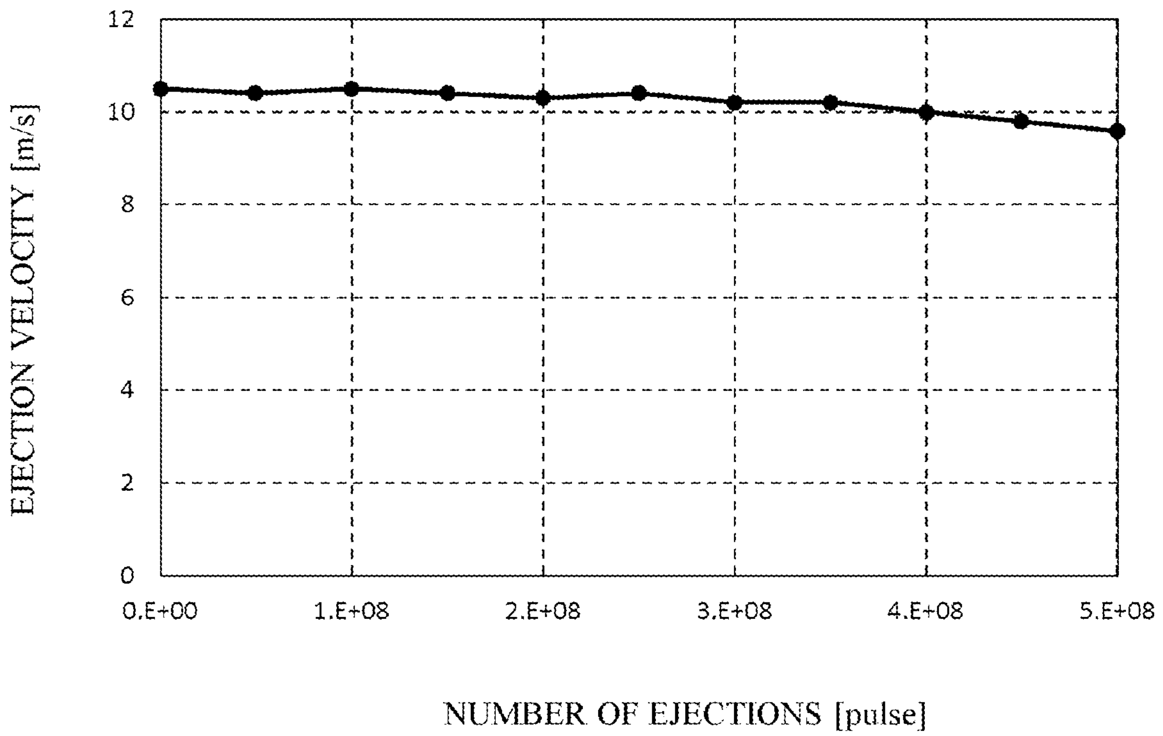
FIG. 7F is a graph showing the relationship between the number of ejections of ink, and the ejection velocity thereof in example 4.

The graph of FIG. 7F shows the relationship between the number of the ejections of the ink, and the ejection velocity thereof when the kogation suppression process of example 4 which was based on the embodiment of the present invention was performed.

In example 4, the potential of the first electrode 133 was set to be −0.2 V, the potential of the second electrode 129 was set to be 1.8 V, and the potential difference between the first electrode 133 and the second electrode 129 was 2 V by the use of the external power supply in the same manner as in example 2.

The voltage applied across the heat element 126 and the first electrode 133 further became lower than in example 2, and whereby the film thickness of the insulating protective layer 127 could be designed thinner, which allowed the liquid to be ejected with lower energy.

The ink was ejected under the same ejection conditions as comparative examples 1 and 2, and example 1. No large reduction in ejection velocity was found, and the reduction in velocity fell within 1 m/s even when the number of ejections exceeded $5\times10^8$. In addition, when the surface of the upper protective layer 124 on the heat element 126 was observed with an optical microscope at this time point, kogation as found in comparative examples 1 and 2 did not adhere thereto as in example 1.

The evaluation results of the foregoing ejection durability are shown in table 1.

TABLE 1

RELATIONSHIP BETWEEN APPLIED VOLTAGE AND CHANGE IN EJECTION VELOCITY

| | Potential of each electrode | | | Change in ejection velocity |
|---|---|---|---|---|
| | First electrode 133 | Second electrode 129 | Substrate 11 | |
| Comparative example 1 | Floating | Floating | 0 V | >2.0 m/s ($0.5\times10^8$ pulses) |
| Comparative example 2 | 0 V | +2.0 V | 0 V | >3.0 m/s ($3.0\times10^8$ pulses) |
| Example 1 | −2.0 V | Floating | 0 V | <0.5 m/s ($5.0\times10^8$ pulses) |
| Example 2 | −1.0 V | +1.0 V | 0 V | <0.5 m/s ($5.0\times10^8$ pulses) |
| Example 3 | −0.5 V | +1.0 V | 0 V | <1.5 m/s ($5.0\times10^8$ pulses) |
| Example 4 | −0.2 V | +1.8 V | 0 V | <1.0 m/s ($5.0\times10^8$ pulses) |

As shown in table 1, it was found that the case where the potential of the first electrode 133 was set to be negative compared to the substrate 11 led to improved ejection durability among the cases under the same condition that the potential difference between the first electrode 133 and the second electrode 129 was 2 V.

As described above, setting the potential of the first electrode 133 to be negative led to improved ejection durability. The foregoing example is just one example, and the potential difference between the first electrode 133 and the second electrode 129, and the potential of each of the electrodes can be determined according to a liquid, etc., and are not limited to the foregoing example.

When applied so that the first electrode 133 has a negative potential and the second electrode 129 has a positive potential, preferably, the voltage is applied so that the potential difference between the first electrode 133 and the second electrode 129 is smaller than 2.5 V. Also in this case, preferably, the voltage is applied so that the potential of the first electrode 133 is at least −2 V and not more than −0.1 V, and the potential of the second electrode 129 is at least 0.1 V and not more than 2.4 V. Also in this case, preferably, the voltage is applied so that the potential of the first electrode 133 is at least −0.5 V and not more than −0.1 V, and the potential of the second electrode 129 is at least 1 V and not more than 2.4 V.

When applied so that the first electrode 133 has a negative potential, preferably, the voltage is applied so that the potential difference between the first electrode 133 and the substrate 11 that is the second layer is smaller than 2.5 V. Also in this case, preferably, the voltage is applied so that the potential of the first electrode 133 is at least −2 V and not more than −0.1 V.

To verify the mechanism of the improvement in ejection durability by setting the potential of the first electrode 133 to be negative, a simple model was created to check the electric field distribution when the voltage was applied to each of the electrodes.

Figure 8A:
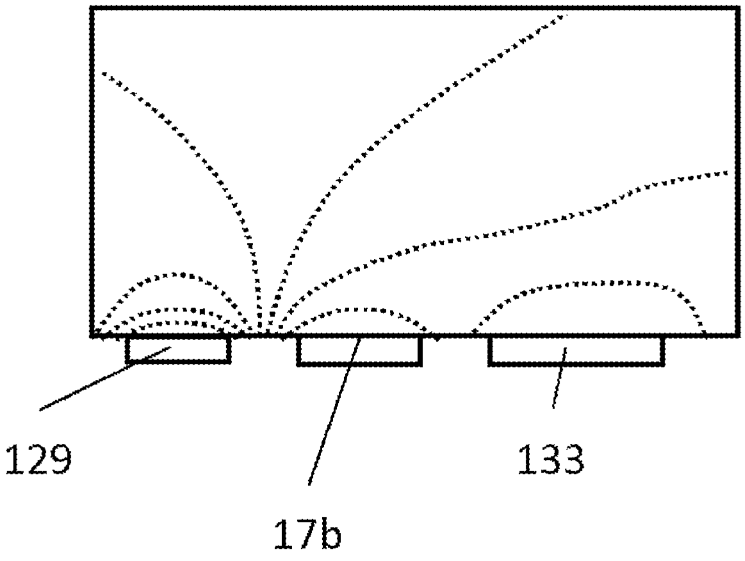
FIGS. 8A and 8B show electric field distributions through simulation.
Figure 8B:
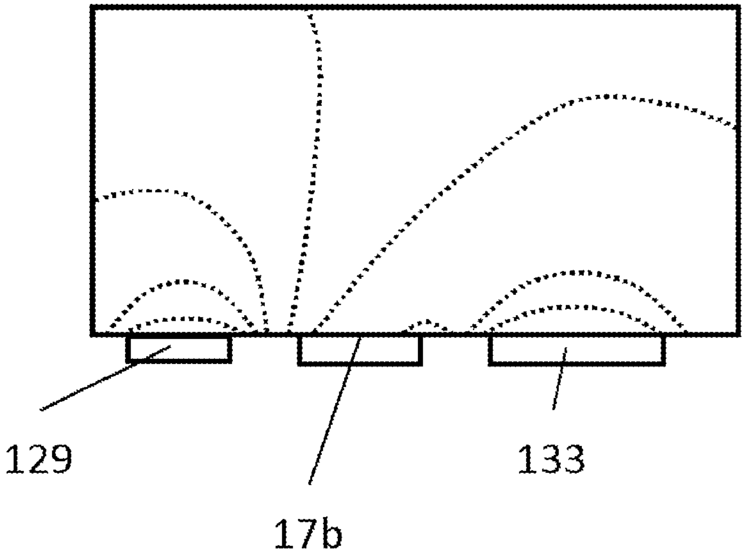

FIGS. 8A and 8B show the electric field distributions throughout the liquid when the voltages as in comparative example 2 and example 2 were applied to each of the electrodes in a simple model.

FIG. 8A shows the electric field distribution when, as in comparative example 2, 0 V was applied to the first electrode 133, 2 V was applied to the second electrode 129, and 0 V, which was the potential of the substrate 11, was applied to the collection port 17*b*.

It was found that the electric field distribution did not concentrate on the first electrode 133 because there was the collection port 17*b* between the first electrode 133 and the second electrode 129, and the potential of the substrate 11 in the collection port 17*b* and the potential of the first electrode 133 were equal.

In contrast, FIG. 8B shows the electric field distribution when, as in example 3, −0.2 V was applied to the first electrode 133, 1.8 V was applied to the second electrode 129, and 0 V, which was the potential of the substrate 11, was applied to the collection port 17*b*. It was found that there was the tendency to generate a denser electric field on the first electrode 133 because the potential of the first electrode 133 was lower than any of the potentials of the second electrode 129, and the substrate 11 in the collection port 17*b*.

As described above, the experiments, and the verification through the simulation clarified that the kogation suppression process by the method of applying a voltage according to the present invention led to improved ejection durability. Employing the present invention allows a better-durable liquid ejection device to be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-209851, filed on Dec. 27, 2022, which is hereby incorporated by reference herein in its entirety.

What is claimed is:

1. A liquid ejection device comprising:

an element substrate provided with an ejection port for ejecting a liquid; and a voltage application unit configured to apply a voltage to the element substrate, wherein the element substrate includes:

a first layer provided with the ejection port on a surface thereof, and a second layer fixed to a back face of the first layer, the first layer is provided with a first channel communicating with the ejection port, the second layer is provided with a second channel communicating with the first channel, a heat element for ejecting the liquid from the ejection port, a first electrode covering a surface of the heat element on a side of the first layer, the first electrode being exposed to the first channel, and a second electrode exposed to the first channel at a position different from the first electrode, the second electrode not overlapping the heat element in a plan view, the second layer is at a potential of 0 V, the voltage application unit is configured to apply the voltage so that the first electrode is at a negative potential and the second electrode is at a positive potential, and the voltage application unit is configured to apply the voltage to the first electrode continuously from before the heat element begins to generate heat for ejecting the liquid from the ejection port and while the heat element is generating the heat.

2. The liquid ejection device according to claim 1, wherein the second layer is provided with a third channel communicating with the first channel, and the first electrode is positioned between the second channel and the third channel in a flowing direction of the liquid in the first channel.

3. The liquid ejection device according to claim 2, wherein the liquid is fed to the first channel from the second channel, and the liquid in the first channel is collected from the third channel.

4. The liquid ejection device according to claim 3, wherein the liquid ejection device is configured so that the liquid can be circulated through the liquid ejection device and the outside of the liquid ejection device.

5. The liquid ejection device according to claim 1, wherein the first electrode and the second electrode are formed of a same material in a platinum group.

6. The liquid ejection device according to claim 1, wherein the first electrode contains Ir, Pt, or Ru.

7. The liquid ejection device according to claim 1, further comprising a protective layer between the heat element and the first electrode.

8. The liquid ejection device according to claim 1, wherein the voltage application unit is configured to apply the voltage so that a potential difference between the first electrode and the second layer is less than 2.5 V.

9. The liquid ejection device according to claim 1, wherein the voltage application unit is configured to apply the voltage so that the first electrode is at a potential of at least −2.0 V and not more than −0.1 V.

10. The liquid ejection device according to claim 1, wherein the first electrode and the second electrode contain Ir, and the voltage application unit is configured to apply the voltage so that a potential difference between the first electrode and the second electrode is smaller less than 2.5 V.

11. The liquid ejection device according to claim 1, wherein the voltage application unit is configured to apply the voltage so that:

the first electrode is at a potential of at least −2.0 V and not more than −0.1 V, and the second electrode is at a potential of at least 0.1 V and not more than 2.4 V.

12. The liquid ejection device according to claim 1, wherein the voltage application unit is configured to apply the voltage so that:

the first electrode is at a potential of at least −0.5 V and not more than −0.1 V, and the second electrode is at a potential of at least 1.0 V and not more than 2.4 V.

* * * * *